US012765528B2

(12) United States Patent
Ooigawa

(10) Patent No.: US 12,765,528 B2
(45) Date of Patent: Oct. 20, 2026

(54) FISHING REEL, INFORMATION PROCESSING DEVICE, AND FISHING INFORMATION PROCESSING SYSTEM

(71) Applicant: GLOBERIDE, Inc., Tokyo (JP)

(72) Inventor: Ryo Ooigawa, Tokyo (JP)

(73) Assignee: GLOBERIDE, INC, Tokyo (JP)

( * ) Notice: Subject to any disclaimer, the term of this patent is extended or adjusted under 35 U.S.C. 154(b) by 352 days.

(21) Appl. No.: 18/276,732

(22) PCT Filed: Oct. 12, 2021

(86) PCT No.: PCT/JP2021/037722
§ 371 (c)(1),
(2) Date: Aug. 10, 2023

(87) PCT Pub. No.: WO2022/176262
PCT Pub. Date: Aug. 25, 2022

(65) Prior Publication Data

US 2024/0122165 A1 Apr. 18, 2024

(30) Foreign Application Priority Data

Feb. 17, 2021 (JP) ................................ 2021-023377

(51) Int. Cl.
*A01K 89/01* (2006.01)

(52) U.S. Cl.
CPC ................................ *A01K 89/0111* (2013.01)

(58) Field of Classification Search
None
See application file for complete search history.

(56) References Cited

U.S. PATENT DOCUMENTS 9,936,682 B1 * 4/2018 Baggett ................ B65H 49/325
2008/0016749 A1 1/2008 Priednieks (Continued)

FOREIGN PATENT DOCUMENTS

CN 202310924 U 7/2012
JP H03054173 U 5/1991

(Continued)

OTHER PUBLICATIONS

Dec. 23, 2024 Extended European Search Report issued in European Patent Application No. 21926691.3.

(Continued)

*Primary Examiner* — Stephanie E Bloss
*Assistant Examiner* — Diana Hancock
(74) *Attorney, Agent, or Firm* — Oliff PLC

(57) ABSTRACT

It is an object of the present invention to provide a fishing reel, an information processing device, and a fishing information processing system comprising the same that are capable of more accurately calculating a casting distance of a fishing line (a line length of a released fishing line) and notifying an angler of the casting distance when fishing is performed using the fishing reel. A fishing reel according to an embodiment of the present invention comprises a throwing start detection unit that detects a throwing start, a throwing end detection unit that detects a throwing end, a handle rotation detection unit that detects the number of rotations of a handle of the fishing reel, and a line length calculation unit that calculates a line length of a released fishing line, in which the line length calculation unit calculates the line length of the fishing line on the basis of the number of rotations of the handle detected by the handle rotation detection unit from the throwing start to the throwing end.

15 Claims, 13 Drawing Sheets

1

(56) References Cited

U.S. PATENT DOCUMENTS

| | | | | |
|---|---|---|---|---|
| 2016/0023863 | A1 * | 1/2016 | Martin | G01D 5/12 242/563.2 |
| 2018/0217257 | A1 * | 8/2018 | Murphy | A01K 79/00 |
| 2020/0107529 | A1 | 4/2020 | Ikebukuro | |
| 2021/0029982 | A1 * | 2/2021 | Kaihara | A01K 89/0102 |

FOREIGN PATENT DOCUMENTS

| | | | |
|---|---|---|---|
| JP | H04009565 | U | 1/1992 |
| JP | H06-113703 | A | 4/1994 |
| JP | H07-194279 | A | 8/1995 |
| JP | 2001321042 | A | 11/2001 |
| JP | 3411803 | B2 | 6/2003 |
| JP | 2004-173676 | A | 6/2004 |
| JP | 2006081527 | A | 3/2006 |
| JP | 2020-058248 | A | 4/2020 |
| WO | 2006/070741 | A1 | 7/2006 |

OTHER PUBLICATIONS

Jun. 4, 2024 Office Action issued in Japanese Patent Application No. 2021-023377.

International Preliminary Report on Patentability in connection with related International Patent Application No. PCT/JP2021/037722; report dated Aug. 22, 2023; (12 pages).

International Search Report for related International Application No. PCT/JP2021/037722; action dated Aug. 25, 2022; (2 pages).

Written Opinion for related International Application No. PCT/JP2021/037722; action dated Aug. 25, 2022; (5 pages).

Jul. 30, 2025 Office Action issued in Chinese Patent Application No. 202180092843.7.

Oct. 29, 2025 Office Action issued in Japanese Patent Application No. 2024-203736.

Jul. 30, 2025 Office Action issued in Korean Patent Application No. 10-2023-7031237.

Apr. 8, 2026 Office Action issued in Japanese Patent Application No. 2024-203736.

* cited by examiner

FISHING REEL, INFORMATION PROCESSING DEVICE, AND FISHING INFORMATION PROCESSING SYSTEM

TECHNICAL FIELD

Cross Reference

The present application claims priority based on Japanese Patent Application No. 2021-023377 (filed on Feb. 17, 2021), the contents of which are incorporated herein by reference in their entirety.

The present invention relates to a fishing reel capable of calculating a line length of a fishing line at the time of throwing, an information processing device, and a fishing information processing system comprising the same.

BACKGROUND ART

Conventionally, various spinning reels capable of releasing a fishing line are known. In a case of fishing using such a spinning reel, the angler has to rely on his or her own senses to determine how much the fishing line is released when a lure or a bait is thrown.

As a fishing reel capable of detecting feeding or winding of a fishing line, for example, Patent Literature 1 discloses a fishing line detection device of a spinning reel that detects a fishing line to be wound around a spool or a fishing line having been fed out from the spool, the fishing line detection device comprising a light emitting unit of a light beam and a light receiving unit that receives the light beam emitted from the light emitting unit, in which a sensor that detects the fishing line in a non-contact manner when the fishing line is being wound around the spool or when the fishing line is being fed out from the spool is provided on a stationary member of the spinning reel or a fishing rod to which the spinning reel is attached.

Further, Patent Literature 2 discloses a counter device for a spinning reel comprising a control unit that obtains data that allows the user to grasp a winding amount of a fishing line corresponding to a predetermined operation amount of a drive unit that operates when the fishing line is being wound around a spool, holds the data in a storage unit at the time of winding the fishing line, measures an operation amount of the drive unit until the winding of the fishing line is completed at the time of pulling a projected fishing rig from a predetermined position, and notifies the user of a distance between the predetermined position and the device on the basis of the measurement result and the data held in the storage unit.

CITATION LIST

Patent Literature

Patent Literature 1: JP 2006-081527 A
Patent Literature 2: JP H4-009565 U

SUMMARY OF INVENTION

Technical Problem

However, even if an attempt is made to measure the line length of the fishing line using the photoelectric sensor in Patent Literature 1, there is a problem that it is practically difficult to accurately detect the line length of the fishing line, such as erroneous detection due to the influence of external light. Further, in the method according to Patent Literature 2, since the user needs to press the reset button after a throwing start operation, there is a problem that the line length cannot be accurately calculated if the user forgets to press the button or presses the button at a time other than the time of starting the throwing. In addition, when the fishing line is released by a drag force when a fish is caught, even if the line length of the fishing line is calculated from the operation amount of the drive unit, the line length deviates from the actual casting distance of the fishing line, and there is also a problem that it is difficult to accurately grasp the line length.

The present invention has been made in view of the above circumstances, and an object of the present invention is to provide a fishing reel, an information processing device, and a fishing information processing system comprising the same that are capable of more accurately calculating a casting distance of a fishing line (a line length of a released fishing line) and notifying an angler of the casting distance when fishing is performed using the fishing reel. Purposes of the present invention other than this object will be clarified by referring to the overall description disclosed herein.

Solution to Problem

A fishing reel according to an embodiment of the present invention comprises a throwing start detection unit that detects a throwing start, a throwing end detection unit that detects a throwing end, a handle rotation detection unit that detects the number of rotations of a handle of the fishing reel, and a line length calculation unit that calculates a line length of a released fishing line, in which the line length calculation unit calculates the line length of the fishing line on the basis of the number of rotations of the handle detected by the handle rotation detection unit from the throwing start to the throwing end.

The fishing reel according to the embodiment of the present invention is configured such that the calculated line length or the number of rotations of the handle is initialized on the basis of detection of a current throwing end or detection of a next throwing start.

A fishing reel according to the embodiment of the present invention is configured to further comprise a storage unit, in which the storage unit stores information of a throwing start, a throwing end, and the number of rotations of a handle, or a line length of a fishing line.

The fishing reel according to the embodiment of the present invention is configured such that a throwing end of a current throwing is determined on the basis of detection of a next throwing start by the throwing start detection unit.

The fishing reel according to the embodiment of the present invention is configured such that the throwing start detection unit and the throwing end detection unit are a bail, and a throwing end of a current throwing is determined by detecting an operation of the bail operated at a time of throwing. Further, in the fishing reel according to the embodiment of the present invention, the throwing start detection unit and the throwing end detection unit detect an approach of a part to be detected provided on the fishing line, and a throwing end of a current throwing is determined on the basis of the detection.

The fishing reel according to the embodiment of the present invention is configured to further comprise a display unit, and the display unit displays the line length of the fishing line.

The fishing reel according to the embodiment of the present invention is configured to further comprise a transmission unit, and the transmission unit transmits the line length of the fishing line to the outside.

The fishing reel according to the embodiment of the present invention is configured to further comprise a drag release amount detection unit that detects a drag release amount, in which the line length calculation unit calculates the line length of the fishing line by subtracting a difference based on the drag release amount from the line length of the fishing line based on the number of rotations of the handle. Further, the fishing reel according to the embodiment of the present invention is configured such that the drag release amount is initialized on the basis of detection of the throwing end or detection of the throwing start.

A fishing information processing system according to the embodiment of the present invention is configured such that a fishing reel comprising a throwing start detection unit that detects a throwing start, a throwing end detection unit that detects a throwing end, a handle rotation detection unit that detects the number of rotations of a handle of the fishing reel, and an information processing device comprising a line length calculation unit that calculates a line length of a released fishing line, in which the line length calculation unit calculates the line length of the fishing line on the basis of the number of rotations of the handle detected by the handle rotation detection unit from the throwing start to the throwing end.

The fishing information processing system according to the embodiment of the present invention is configured such that the information processing device further comprises a transmission-reception unit, and the transmission-reception unit receives information of a throwing start, a throwing end, and the number of rotations of a handle from the fishing reel.

The fishing information processing system according to the embodiment of the present invention is configured such that the information processing device further comprises a transmission-reception unit, and the transmission-reception unit transmits information of the calculated line length of the fishing line to the fishing reel.

The fishing information processing system according to the embodiment of the present invention is configured such that the information processing device further comprises a display unit, and the display unit displays the line length of the fishing line.

In the fishing information processing system according to the embodiment of the present invention, the information processing device is a mobile terminal, a wearable terminal, or a computer device.

An information processing device according to the embodiment of the present invention is configured to comprise a reception unit that receives information from an outside, and a line length calculation unit that calculates a line length of a fishing line, in which the reception unit receives information of a throwing start, information of a throwing end, and information of the number of rotations of a handle of a fishing reel from the outside, and the line length calculation unit calculates the line length of the fishing line on the basis of the information.

Advantageous Effects of Invention

According to the above embodiment, it is possible to provide a fishing reel, an information processing device, and a fishing information processing system comprising the same that are capable of more accurately calculating a casting distance of a fishing line (a line length of a released fishing line) and notifying an angler of the casting distance when fishing is performed using the fishing reel.

DESCRIPTION OF EMBODIMENTS

Figure 1:
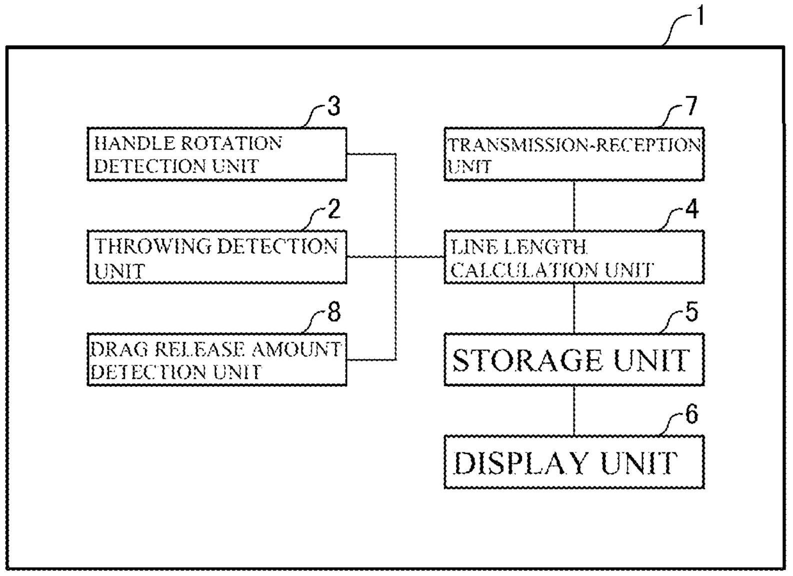
FIG. 1 is a diagram illustrating a basic configuration of a fishing reel according to an embodiment of the present invention.

An embodiment of a fishing reel and the like according to the present invention will now be described in detail with reference to the accompanying drawings. Components common in a plurality of drawings are assigned with the same reference signs throughout the plurality of drawings. It should be noted that each of the drawings is not always illustrated in a precise aspect ratio for the convenience of description.

First, a configuration of a fishing reel 1 according to the embodiment of the present invention will be described with reference to FIG. 1.

As illustrated in the drawing, the fishing reel 1 according to the embodiment of the present invention comprises a throwing detection unit 2 comprising a throwing start detection unit that detects a throwing start and a throwing end detection unit that detects a throwing end, a handle rotation detection unit 3 that detects the number of rotations of a handle of the fishing reel 1, and a line length calculation unit 4 that calculates a line length of a released fishing line, in which the line length calculation unit 4 is configured to calculate the line length of the fishing line on the basis of the number of rotations of the handle detected by the handle rotation detection unit 3 from the throwing start to the throwing end.

With the fishing reel 1 according to the embodiment of the present invention, it is possible to provide a fishing reel capable of more accurately calculating a casting distance of a fishing line (a line length of a released fishing line) and notifying an angler of the casting distance when fishing is performed.

As illustrated in FIG. 1, the fishing reel 1 according to the embodiment of the present invention comprises a storage unit 5, and the storage unit 5 can store at least any or all of information of throwing start, throwing end, or the number of rotations of a handle, or information of a line length of a fishing line.

Further, as illustrated in the drawing, the fishing reel 1 according to the embodiment of the present invention comprises a display unit 6, and the display unit 6 can display the line length of the fishing line. Accordingly, when fishing is performed, it is possible to notify the angler of the casting distance of the fishing line (the line length of the released fishing line). In addition, the display unit 6 may be capable of displaying at least one of pieces of information of the throwing start, the throwing end, and the number of rotations of the handle. Furthermore, an output unit (not illustrated) can be separately provided, and when fishing is performed, it is possible to notify the angler of the casting distance of the fishing line (the line length of the released fishing line) by sound or the like. The output unit can perform various outputs other than sound, and is not limited to a specific mode.

Moreover, as illustrated in the drawing, the fishing reel 1 according to the embodiment of the present invention comprises a transmission-reception unit 7 comprises a transmission unit and a reception unit, and the transmission unit of the transmission-reception unit 7 is configured to transmit information of the line length of the fishing line to the outside. Here, the outside refers to, for example, a computer, a smartphone, smart glasses, a smart watch, or a fishing dedicated device, but is not limited thereto.

Here, calculation of the line length of the fishing line is performed for each throwing, and the timing of end of each throwing is determined on the basis of detection of the current throwing end or detection of the next throwing start. After the line length of the current throwing is calculated, the calculation result is stored in the storage unit 5, and then the calculated current line length is initialized (reset) for the calculation of the line length of the next throwing. Further, the number of rotations of the handle may be initialized (reset). Thus, mixture with the line length for another throwing can be prevented.

Further, in the fishing reel 1 according to the embodiment of the present invention, the throwing end of the current throwing can be determined on the basis of detection of the start of the next throwing by the throwing start detection unit of the throwing detection unit 2. This is because, when the next throwing start is detected, it also means the current throwing end, and thus the information of detection of the throwing start can be more effectively utilized by determining detection of the next throwing start as the detection of the current throwing end.

In the fishing reel 1 according to the embodiment of the present invention, when the throwing start detection unit and the throwing end detection unit of the throwing detection unit 2 are a bail, the throwing end of the current throwing may be determined by detecting an operation of the bail operated at the time of throwing. Thus, there is an advantage that the throwing detection can be performed without requiring the angler to perform an additional operation such as pressing of a button.

As illustrated in FIG. 1, the fishing reel 1 according to the embodiment of the present invention comprises a drag release amount detection unit 8 that detects a drag release amount, and the line length calculation unit 4 is configured to calculate the line length of the fishing line by subtracting a difference based on the drag release amount detected by the drag release amount detection unit 8 from the line length of the fishing line based on the number of rotations of a handle. Further, in the fishing reel 1 according to the embodiment of the present invention, the drag release amount can be initialized on the basis of detection of the throwing end or detection of the throwing start.

With the fishing reel 1 according to the embodiment of the present invention, it is possible to more accurately calculate the casting distance of the fishing line (the line length of the released fishing line) when fishing is performed.

Figure 2:
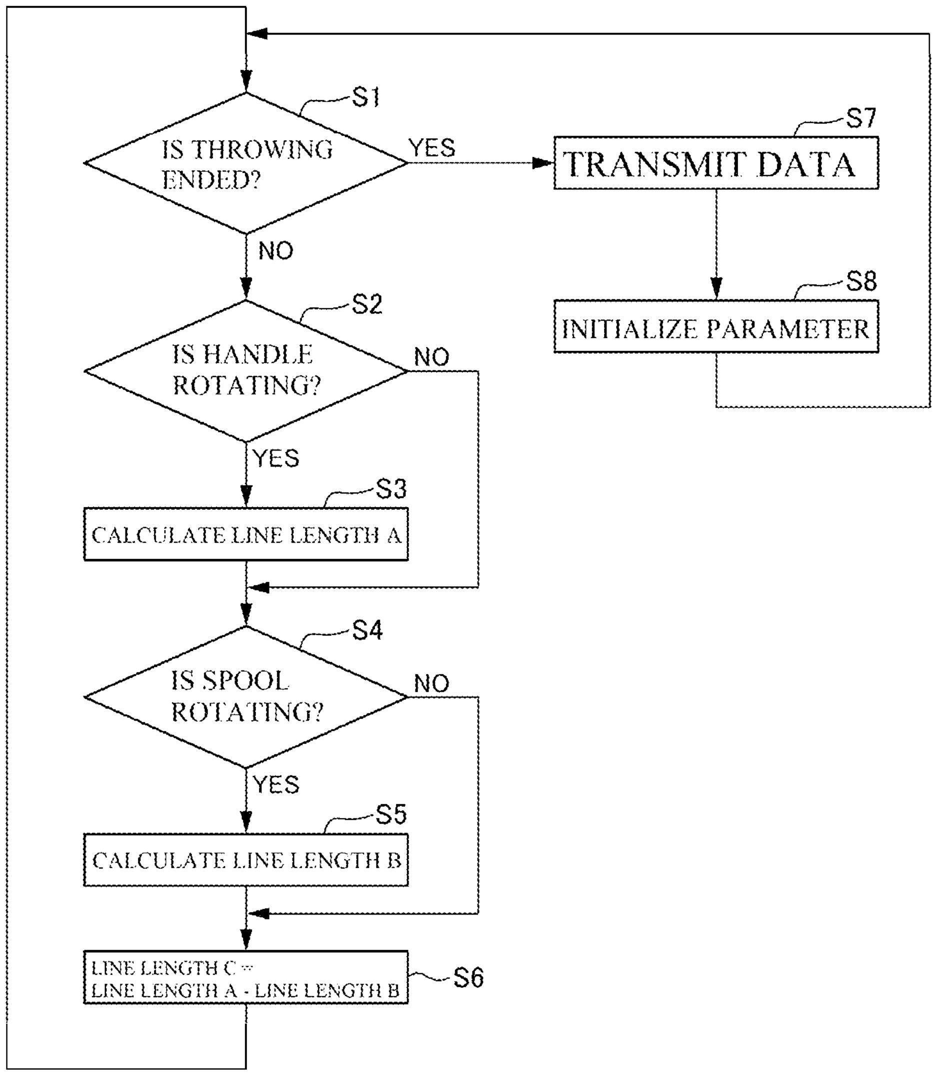
FIG. 2 is a diagram illustrating an outline of a line length calculation procedure of a fishing line in the fishing reel according to the embodiment of the present invention.

Next, a method for calculating the line length of the fishing line released by the fishing reel 1 according to the embodiment of the present invention will be described in more detail with reference to FIG. 2.

First, in step S1, it is determined whether a throwing is ended. When the throwing is ended, the process proceeds to step S7, and data of the calculated line length is transmitted (or stored). Thereafter, the process proceeds to step S8, and data of the line length is initialized (reset). At that time, the number of rotations of the handle may be initialized (reset).

In step S1, it is determined whether a throwing is ended. When the throwing is not ended, that is, the throwing is in progress, the processing proceeds to step S2, and it is determined whether the handle of the fishing reel is rotating. If the handle is not rotating, the process proceeds to step S4. When the handle is rotating, the process proceeds to step S3, and a line length A of collected (released) fishing line is calculated on the basis of the number of rotations of the handle.

Next, the process proceeds to step S4 to determine whether the spool is rotating. When the spool is not rotating, the process proceeds to step S6, and the line length A is determined as a line length C of the collected (released) fishing line. On the other hand, if the spool is rotating, the process proceeds to step S5, and a line length B based on this is calculated. Then, the process proceeds to step S6, and the line length C of the collected (released) fishing line is calculated as line length A-line length B.

In this manner, when fishing is performed, the release amount of the fishing line, that is, the line length of the collected fishing line can be calculated more accurately and reliably.

Next, a fishing information processing system according to the embodiment of the present invention will be described with reference to FIG. 3. As illustrated in the drawing, a fishing information processing system 100 according to the embodiment of the present invention comprises the fishing reel 1 comprising the throwing detection unit 2 comprising the throwing start detection unit that detects a throwing start and the throwing end detection unit that detects a throwing end, the handle rotation detection unit 3 that detects the number of rotations of the handle of the fishing reel 1, and an information processing device 10 comprising a line length calculation unit 14 that calculates a line length of a released fishing line, in which the line length calculation unit 14 is configured to calculate the line length of the fishing line on the basis of the number of rotations of the handle detected by the handle rotation detection unit 3 from the throwing start to the throwing end.

Moreover, as illustrated in the drawing, in the fishing information processing system 100 according to the embodiment of the present invention, the information processing device 10 comprises a transmission-reception unit 17, and the transmission-reception unit 17 is configured to receive information of the throwing start, the throwing end, and the number of rotations of the handle of the fishing reel 1 from the fishing reel 1. Further, the information processing device 10 comprises a storage unit 15, and can store these pieces of information.

Further, in the fishing information processing system 100 according to the embodiment of the present invention, the transmission-reception unit 17 of the information processing device 10 can transmit information of the calculated line length of the fishing line to the fishing reel 1. In this manner, the fishing reel 1 can receive the information of the line length from the outside and display the information of the line length on the display unit 6. Thus, the load of a line length calculating process in the fishing reel 1 can be eliminated. In addition, an output unit (not illustrated) can be separately provided, and it is possible to receive information of the line length from the outside and notify the angler of the line length by sound or the like. The output unit can perform various outputs other than sound, and is not limited to a specific mode.

Figure 3:
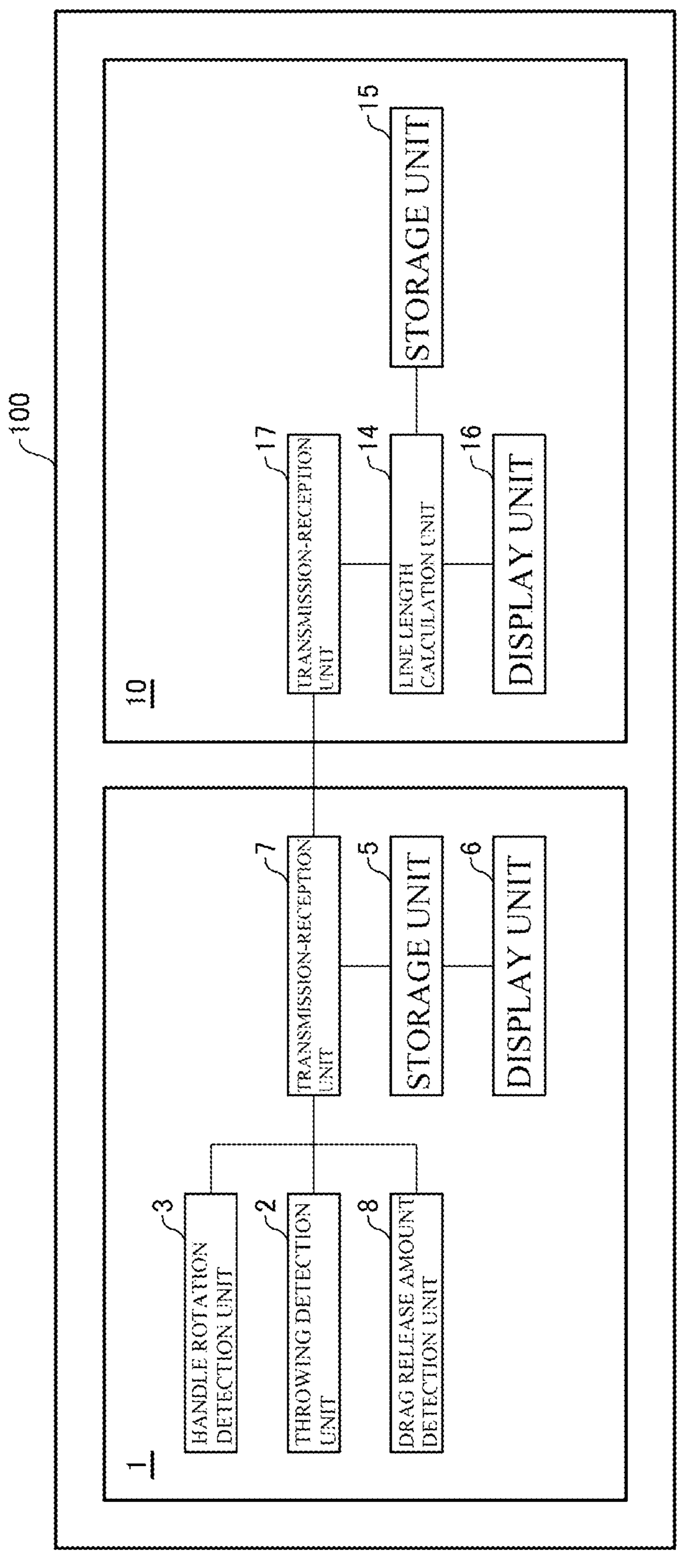
FIG. 3 is a diagram illustrating a basic configuration of a fishing information processing system according to the embodiment of the present invention.

Further, as illustrated in FIG. 3, in the fishing information processing system 100 according to the embodiment of the present invention, the information processing device 10 comprises a display unit 16, and the display unit 16 is configured to display the calculated line length of the fishing line. Note that the display unit 16 can also display information related to overall fishing information comprising the throwing start, the throwing end, and the number of rotations of the handle of the fishing reel 1. In this manner, the fishing information can be centrally managed by the information processing device outside the fishing reel. In addition, an output unit (not illustrated) can be separately provided, and it is possible to notify an angler of information related to fishing information in general by sound or the like. The output unit can perform various outputs other than sound, and is not limited to a specific mode.

In the fishing information processing system 100 according to the embodiment of the present invention, the information processing device 10 is a mobile terminal, a wearable terminal, or a computer device. More specifically, a smartphone, a smart glass, a smart watch, or a device dedicated to fishing are conceivable. Various other devices are conceivable as the information processing device 10, and the information processing device is not limited to a specific device.

As described above, the information processing device 10 according to the embodiment of the present invention comprises the transmission-reception unit 17 comprising the reception unit that receives information from the outside (fishing reel), and the line length calculation unit 14 that calculates the line length of the fishing line. The reception unit receives information of a throwing start, information of a throwing end, and information of the number of rotations of the handle from the outside (fishing reel), and the line length calculation unit 14 calculates the line length of the fishing line on the basis of these pieces of information.

Figure 4:
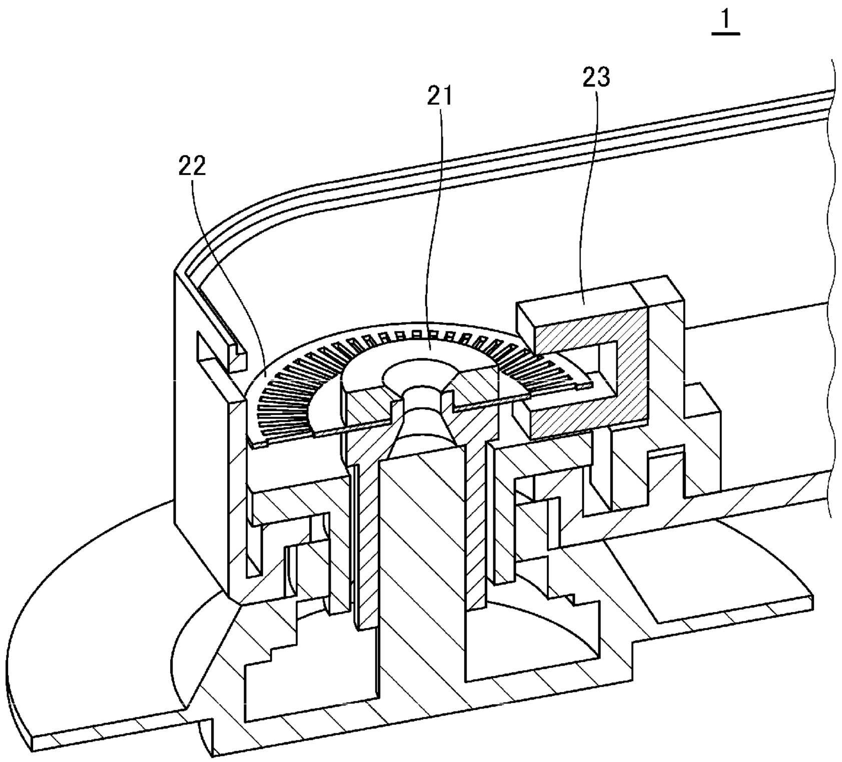
FIG. 4 is a view illustrating a handle rotation detection unit in the fishing reel according to the embodiment of the present invention.

Next, the above-described handle rotation detection unit 3 will be described in more detail with reference to FIG. 4. As illustrated in the drawing, the fishing reel 1 according to the embodiment of the present invention comprises the handle rotation detection unit 3 that detects the number of rotations of the handle, and the handle rotation detection unit comprises a slit plate 22 and a photointerrupter 23, and detects the number of rotations of the handle by measuring the rotation of the slit plate 22 attached to a handle shaft 21 with the photointerrupter 23. Here, the object to be measured is not limited thereto, and may be a gear or the like synchronized with the rotation of the handle or a rotor accelerated by a gear ratio. In addition, the detection method may be a method that uses a part other than the photointerrupter, and is not limited to a specific mode.

Figure 5:
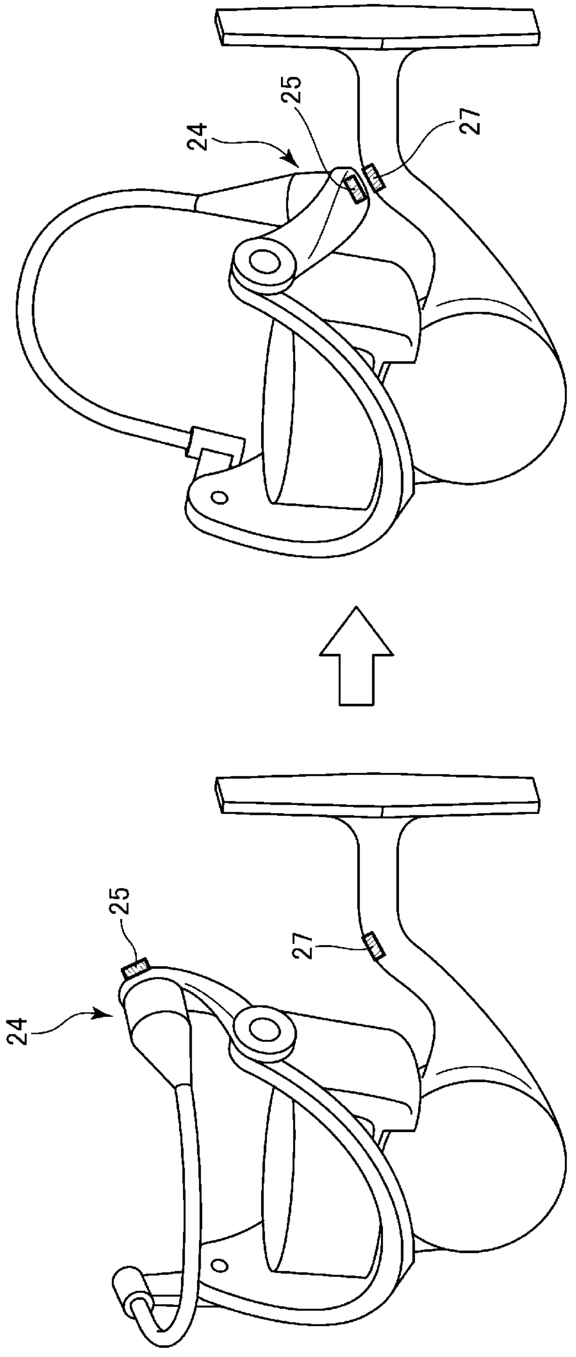
FIG. 5 is a diagram illustrating a throwing detection unit in the fishing reel according to the embodiment of the present invention.

Next, the throwing detection unit 2 will be described more specifically with reference to FIG. 5. As illustrated, the fishing reel 1 according to the embodiment of the present invention comprises the throwing detection unit 2 that detects a throwing start and a throwing end, but as illustrated in FIG. 5, the throwing start and the throwing end can be detected by detecting an operation of the bail part 24 with a magnet 25 attached to the bail part 24 and a Hall element 27 attached to a reel foot portion 26. Here, various methods other than the detection of the operation of the bail part are conceivable for the detection of throwing, and for example, a method of detecting acceleration that can be changed by throwing, a method of detecting movement of the moving object swinging during the throwing operation, and a method of detecting the discharge speed of the fishing line are also conceivable. Other methods will be described later. The method of detecting throwing is not limited to a specific mode.

Figure 6:
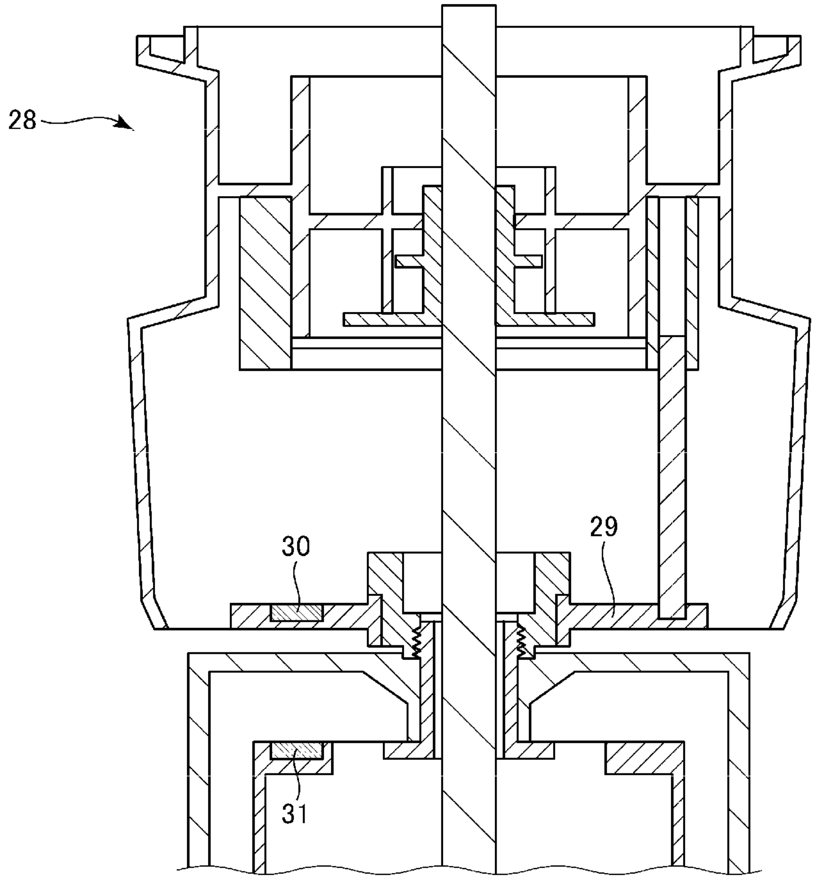
FIG. 6 is a diagram illustrating a drag release amount detection unit in the fishing reel according to the embodiment of the present invention.

Next, the drag release amount detection unit 8 will be described in more detail with reference to FIG. 6. As illustrated in the drawing, the fishing reel 1 according to the embodiment of the present invention comprises the drag release amount detection unit 8 that detects a drag release amount, as illustrated in FIG. 6, a magnet 30 is attached to a rotating body 29 connected to the spool 28 to rotate in synchronization therewith when the spool 28 is rotated by drag, and rotation of the rotating body 29 to which the magnet 30 is attached accompanying rotation of the spool 28 is detected by the Hall element 31, whereby the rotation amount of the spool can be calculated and the drag release amount can be calculated. Here, various methods are conceivable as a method of detecting the rotation of the spool, and for example, a method of attaching a Hall element to a drag knob and attaching a magnet to the spool, and a method of disposing a photosensor inside the spool and disposing a slit plate or a reflector inside the spool are also conceivable. As the method of detecting the rotation of the spool, various modes such as a detected position, a part to be detected, and a sensor can be considered, and the method is not limited to a specific mode.

Figure 7:
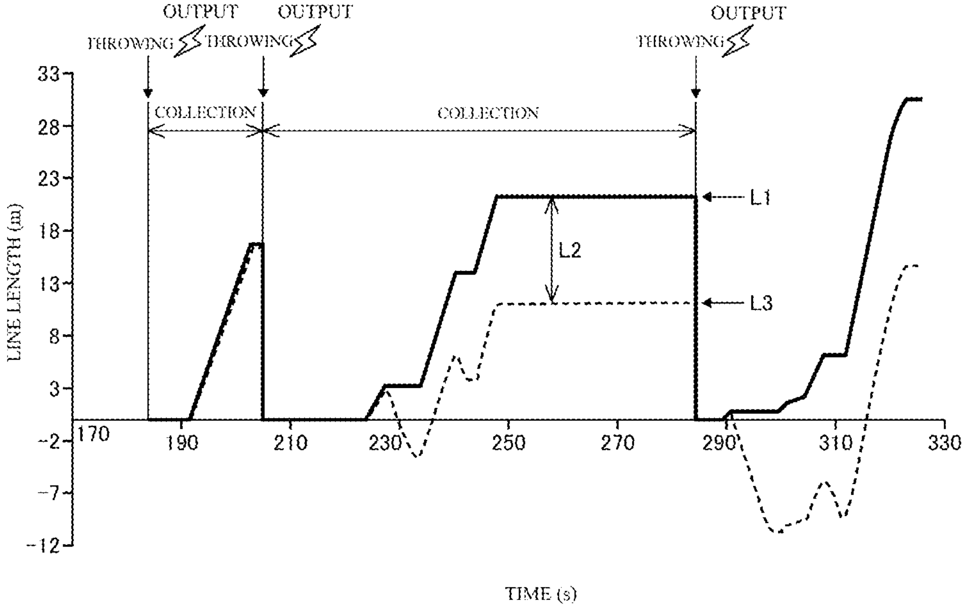
FIG. 7 is a diagram for explaining calculation of the line length of the released fishing line in the fishing reel according to the embodiment of the present invention.

Next, the method for calculating the line length of the released fishing line based on the detection of an operation of the bail will be described more specifically with reference to FIG. 7. As illustrated in the drawing, in the fishing reel 1 according to the embodiment of the present invention, in a case where the method of detecting the operation of the bail is employed as the method for detecting throwing, the operation of the bail operated at the time of throwing is detected, and data detection is started using the detection as a trigger.

As illustrated in the drawing, the rotation of the handle and the rotation state of the spool are monitored, and when the handle rotates, the collected line length L1 is calculated from the rotation amount, and when the spool rotates, the released line length L2 is calculated from the rotation amount. When the handle is rotated and the spool is not rotated, the collected line length (collected distance) is L3=L1. When the handle is rotated and the spool is rotated, the release line length (estimated casting distance) L3=L1−L2. Thereafter, when the bail is operated, it is determined that the throwing is ended, and the calculated line length is output as the estimated casting distance L3. In a case of a normal spinning reel (excluding a reel with a lever brake), each component constituting the reel does not perform an operation such as rotation when the line is released, and is in a stationary state. Therefore, even if the components inside the reel are measured, the release amount of the line cannot be detected.

However, in a normal fishing operation, the line length at the time of starting releasing is adjusted to be almost the same in most cases. Therefore, when elongation or cutting of the fishing line can be ignored, by measuring the collected amount of the fishing line until the discharge start, it can be regarded as the release amount of the immediately preceding fishing line.

In addition, an acceleration value can be used as the throwing detection unit by an acceleration sensor attached to a fishing rod, a fishing reel, or the like, and in this case, a constant threshold is provided for the acceleration value, and when the acceleration value exceeds the threshold, it is determined that a throwing is started, and various kinds of detection and calculation processing and outputs thereof can be performed.

Detection information during each throwing may be always output, or the current winding amount, the release amount by drag, and the like may be always displayed on various output devices. In a case of the next throwing, these pieces of output information related to the previous throwing is initialized (reset).

Figure 8:
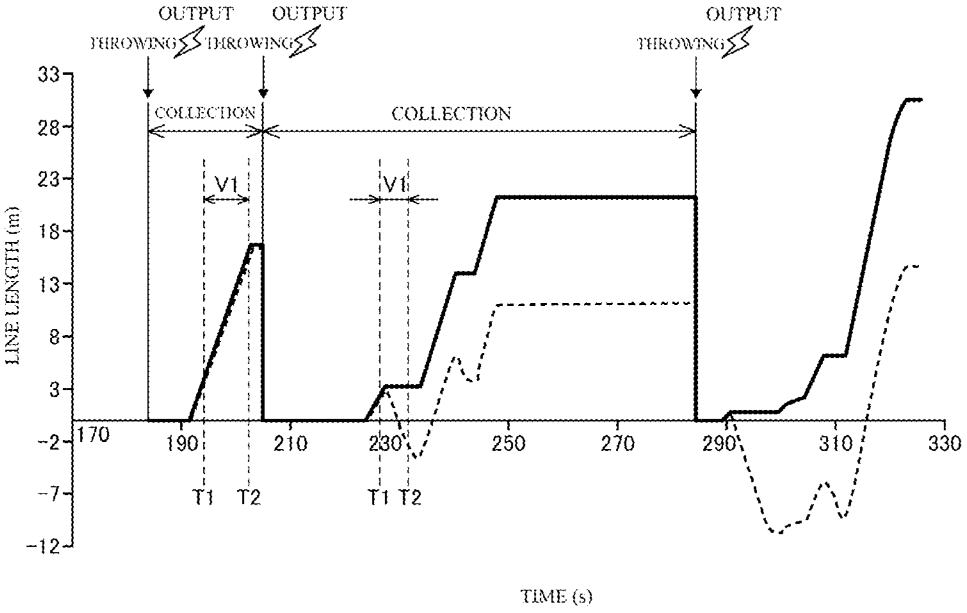
FIG. 8 is a diagram illustrating output of a handle rotation speed in the fishing reel according to the embodiment of the present invention.

Next, a method of outputting an average speed of handle rotation will be described with reference to FIG. 8. As illustrated in the drawing, in the fishing reel 1 according to the embodiment of the present invention, when the rotation average speed of the handle of the fishing reel 1 is output, an operation of collecting a line slack and sinking the lure to an arbitrary water depth occurs after the operation of the bail is detected in the throwing operation. In order to ignore the rotation speed during this period, for example, a time T1 is acquired by a timer function of a microcomputer at the fifth rotation after starting the collecting operation of the lure, and a time T2 is acquired again by the timer function of the microcomputer at the 15th rotation after starting the collecting operation. The rotation speed of the handle between T1 and T2 is acquired, and an average speed V1 of the handle rotation between T1 and T2 at the time of acquiring T2 is calculated. When the operation of the bail at the time of the next throwing is detected by collecting the lure, the output of V1 can be performed. With this configuration, there is an advantage that it is possible to refer to the handle rotation speed calculated more accurately when the angler performs the next and subsequent throwing and tries to reproduce the stored previous handle rotation speed.

Figure 9A:
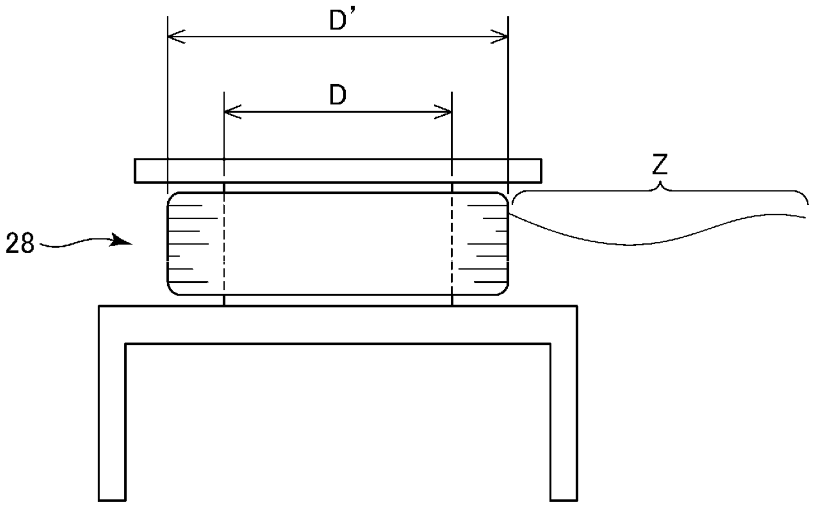
FIG. 9 is a diagram illustrating a method of correcting the line length of the released fishing line by the fishing reel according to the embodiment of the present invention.
Figure 9B:
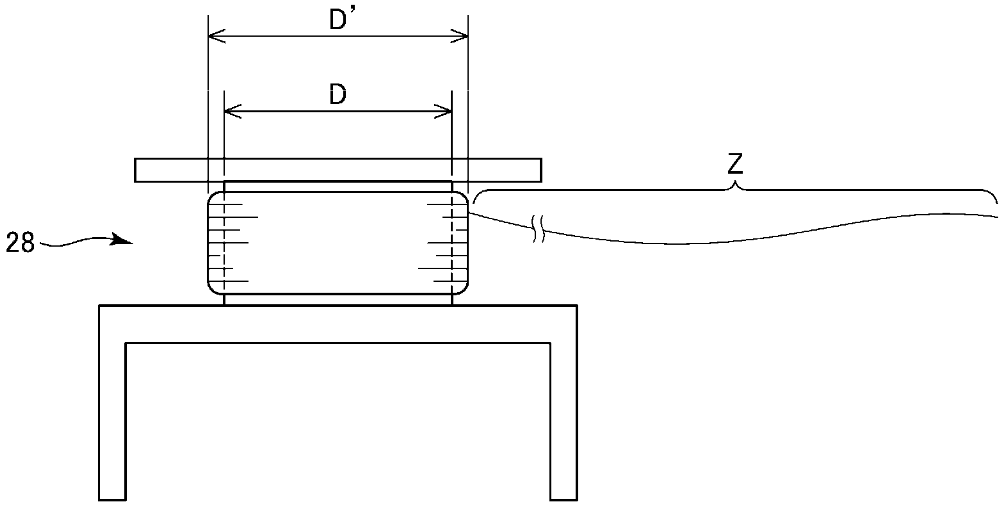

Next, a method of correcting the line length of the released fishing line will be described with reference to FIGS. 9*a* and 9*b*. The illustrated line length correcting method calculates a line length by calculating a correction value of the collected (released) line length with respect to the number of rotations N of the handle from the relationship between a bottom diameter D of the spool 28 measured in advance and the number of rotations N of the handle necessary for winding the wound line length L, and thereby corrects a collected amount (release amount) Z per rotation of the spool 28 caused by a diameter D' changing due to collection (release) of the fishing line. The collected amount (release amount) Z can be expressed as follows.

Collected amount (release amount) $Z$=the number of rotations of the handle $N$×gear ratio×corrected line length Thus, the line length can be more accurately calculated.

Figure 10A:
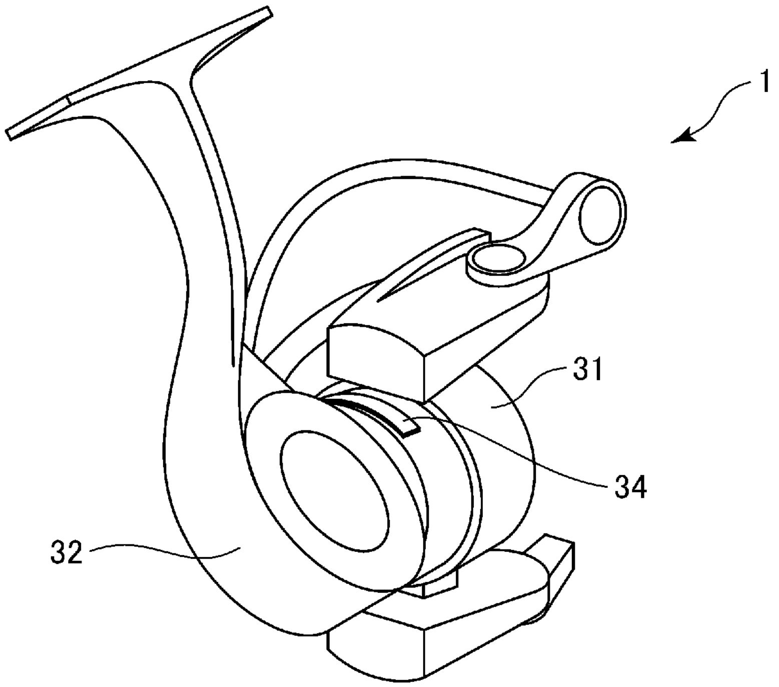
FIG. 10 is a diagram illustrating a method of detecting the throwing end by the fishing reel according to the embodiment of the present invention.
Figure 10B:
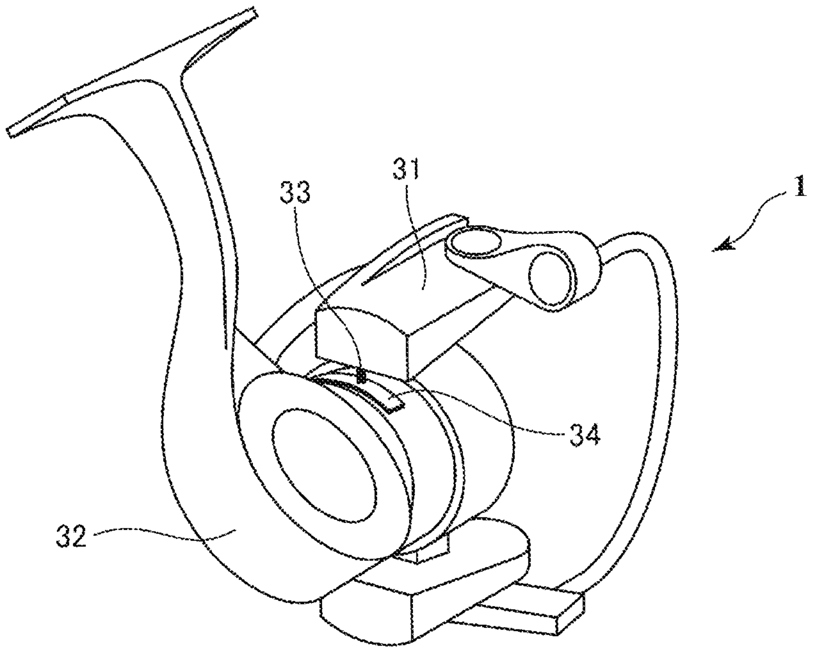

Next, another aspect of the method for detecting a throwing end by the fishing reel 1 according to the embodiment of the present invention will be described with reference to FIGS. 10*a* and 10*b*. As illustrated in the drawings, the fishing reel 1 according to the embodiment of the present invention comprises the throwing detection unit that detects a throwing end (throwing start), but as illustrated in FIGS. 10*a* and 10*b*, a part to be detected 33 configured to project in accordance with an operation of a bail part is provided on a side of a rotating part 31 of the fishing reel, and a detection unit 34 is provided on a side of a main body portion 32 of the fishing reel 1 so as to come into contact with the part to be detected 33 when the part to be detected 33 projects (state of FIG. 10*b*). In this manner, the throwing end (throwing start) can be detected by detecting the contact of the part to be detected 33 with the detection unit 34 due to the operation of the bail part.

Figure 11A:
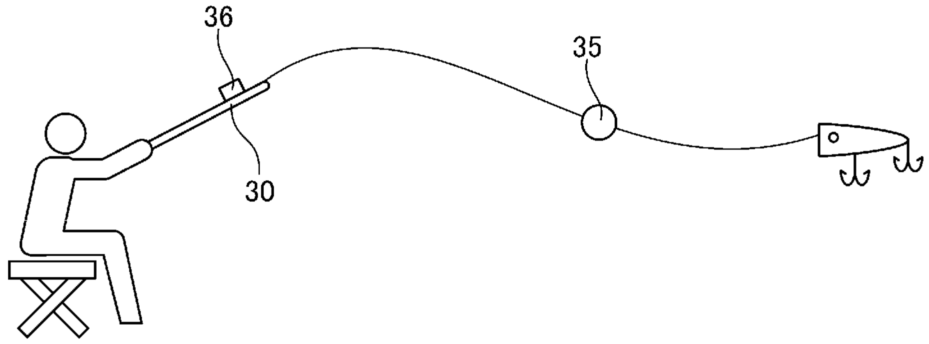
FIG. 11 is a diagram illustrating a method of detecting the throwing end with the fishing reel or the like according to the embodiment of the present invention.
Figure 11B:
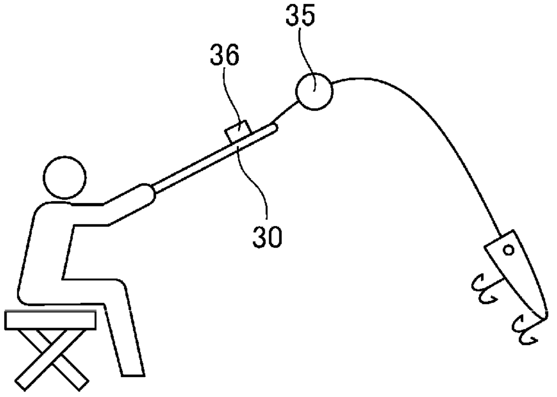

Next, another aspect of the method for detecting a throwing end by the fishing reel 1 and the like according to the embodiment of the present invention will be described with reference to FIGS. 11*a* and 11*b*. As illustrated in the drawing, a fishing rod 30 provided with the fishing reel 1 according to the embodiment of the present invention comprises the throwing detection unit that detects a throwing end (throwing start), but as illustrated in FIGS. 11*a* and 11*b*, a part to be detected 35 is provided on the fishing line, a detection unit 36 such as a limit switch that is not in contact with the fishing rod 30 is provided, and the detection unit 36 detects an approach of the part to be detected 35 (FIG. 11*b*). In this manner, the throwing end can be detected by detecting the approach of the part to be detected 35 provided on the fishing line to the detection unit 36. Here, in the illustrated example, it has been described that the detection unit 36 is provided on the fishing rod 30, but the detection unit 36 may be provided on the fishing reel 1.

Figure 12:
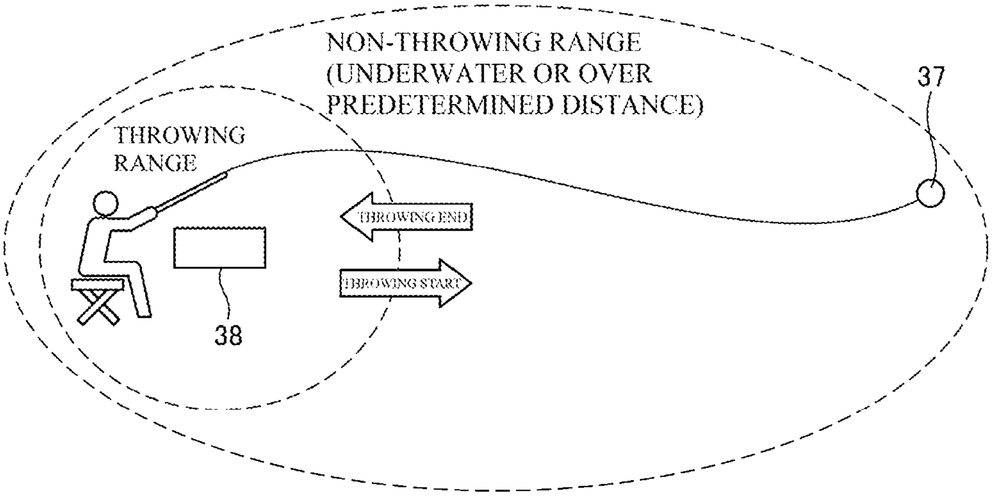
FIG. 12 is a diagram illustrating a method of detecting the throwing end with the fishing reel or the like according to the embodiment of the present invention.

Next, another aspect of the method for detecting a throwing end by the fishing reel 1 or the like according to the embodiment of the present invention will be described with reference to FIG. 12. As illustrated in the drawing, a detection unit 38 that detects the throwing end (throwing start) is provided in another fishing gear near the fishing reel 1 according to the embodiment of the present invention. On the other hand, a part to be detected 37 is provided in the fishing line, and the detection unit 38 is configured to be able to determine a communication state and a distance with the part to be detected. In this manner, the throwing end (throwing start) can be detected by determining whether the part to be detected 37 is in a region during throwing or a region during non-throwing of the part to be detected 37 on the basis of a communication state (communication enabled state or communication interrupted state) or a distance (less than a predetermined distance, or equal to or more than the predetermined distance) with the part to be detected 35 provided in the fishing line. Here, in the illustrated example, it has been described that the detection unit 38 is provided in another fishing tool, but the detection unit 38 may be provided in the fishing reel 1 or the fishing rod 30.

Next, another embodiment of the handle rotation detection unit 3 and the drag release amount detection unit 8 in the fishing reel 1 according to the embodiment of the present invention will be described with reference to FIG. 13. Here, the drag mechanism can be achieved by a method of relatively rotating the rotor and the handle in addition to the method of relatively rotating the spool and the main shaft illustrated in FIG. 6 described above. Hereinafter, the method will be described more specifically with reference to FIG. 13.

Figure 13:
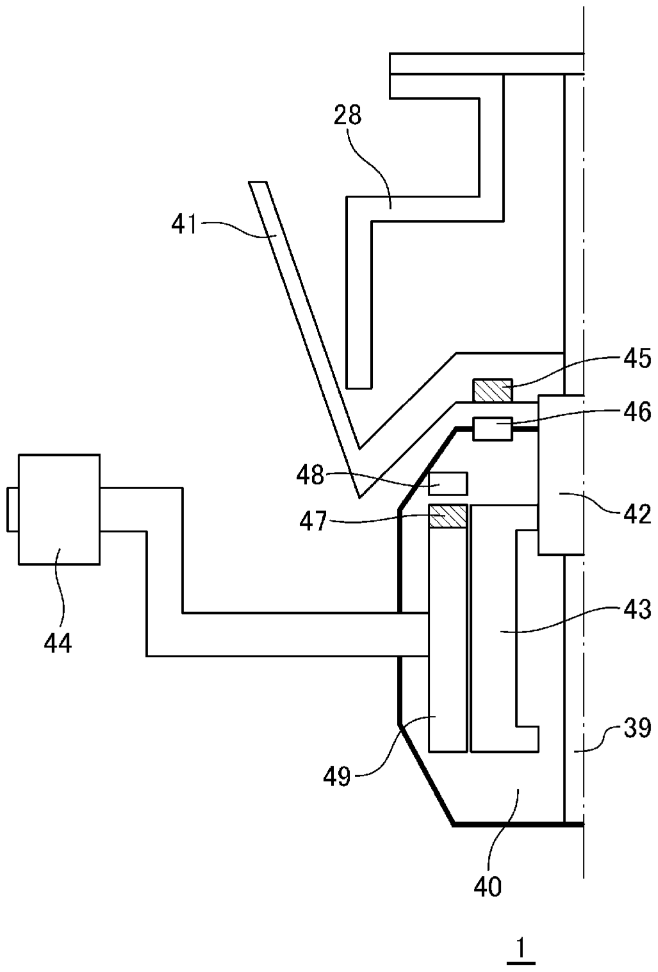
FIG. 13 is a diagram illustrating another embodiment of the handle rotation detection unit 3 and the drag release amount detection unit 8 in the fishing reel according to the embodiment of the present invention.

As illustrated in FIG. 13, the spool 28 is fixed to a main shaft (main shaft) 39, and the main shaft 39 is non-rotatably supported with respect to a reel main body 40. At this time, an oscillator mechanism that evenly winds the fishing line around the spool 28 by moving the main shaft 39 up and down in the axial direction according to rotation of a rotor 41 may be provided. A conventionally known oscillator mechanism can be used as appropriate, and is omitted in FIG. 13 for simplification.

The rotor 41 is fixed to a pinion gear 42, and receives rotation transmission from a face gear 43 of the pinion gear 42. Then, the drag mechanism is provided between the rotor 41 and a handle 44. Thus, it is possible to avoid breakage of the fishing line by idling the rotor 41 with respect to the handle 44 when receiving the torque equal to or more than the set value. In the illustrated example, a conventionally known drag mechanism is provided between the handle 44 and the face gear, but a similar function can be achieved by providing a drag mechanism between the pinion gear 42 and the rotor 41.

In the configuration illustrated in FIG. 13, the collected amount of the line can be acquired by reading the number of rotations of the rotor 41. Thus, a part to be detected (for example, a part of rotor to be detected 45) is provided at the rotor 41 or a part that rotates depending on the rotor 41 (rotor itself, pinion gear, face gear, or the like), and a detection unit (for example, a rotor detection unit 46) is provided at a portion of the reel main body 40 facing the part to be detected. The collected amount of the line can be acquired from the output value of the rotor detection unit 46. Here, a specific configuration of the rotor detection unit 46 can be achieved by a method similar to that illustrated in FIG. 4.

In addition, the drag release amount may be acquired by obtaining a difference between the number of rotations of the rotor and the number of rotations of the handle. Thus, a part to be detected (for example, a handle-detected part 47 provided in the drag mechanism 49) is provided at a portion that rotates in synchronization with the handle 44 (handle itself, part of drag mechanism, and the like), and a handle detection unit 48 is provided at a portion of the reel main body 40 facing the part to be detected. From the difference between the output values of the handle detection unit 48 and the rotor detection unit 46, the drag release amount can be detected. Here, a specific configuration of the handle detection unit 46 can be achieved by a method similar to that illustrated in FIG. 4.

Dimensions, materials, and arrangements of the components described in this specification are not limited to those explicitly described in the embodiments, and the components may be modified to have any dimensions, materials, and arrangements that may fall within the scope of the present invention. Further, components not explicitly described herein can be added to the described embodiments, or some of the components described in each embodiment can be omitted.

REFERENCE SIGNS LIST

1 Fishing reel
2 Clutch throwing detection unit
3 Handle rotation detection unit
4 Line length calculation unit
5 Storage unit
6 Display unit
7 Transmission-reception unit
8 Drag release amount detection unit
10 Information processing device
14 Line length calculation unit
15 Storage unit
16 Display unit
21 Handle shaft
22 Slit plate
23 Photointerrupter
24 Bail part
25 Magnet
26 Reel foot portion
27 Hall element
28 Spool
29 Rotating body
30 Fishing rod
31 Rotating part
32 Main body portion
33 Part to be detected
34 Detection unit
35 Part to be detected
36 Detection unit
37 Part to be detected
38 Detection unit
39 Main shaft
40 Reel main body
41 Rotor
42 Pinion gear
43 Face gear
44 Handle
45 Part of rotor to be detected
46 Rotor detection unit
47 Handle-detected part
48 Handle detection unit
49 Drag mechanism
100 Fishing information processing system

The invention claimed is:

1. A fishing reel comprising:
a throwing detection unit configured to detect a throwing start and a throwing end,
a handle rotation detection unit that detects a number of rotations of a handle of the fishing reel,
a line length calculation unit that calculates a line length of a released fishing line, and
a drag release amount detection unit that detects a drag release amount, wherein
the line length calculation unit calculates the line length of the fishing line:
on a basis of the number of rotations of the handle detected by the handle rotation detection unit from the throwing start to the throwing end, and
by subtracting a difference based on the drag release amount from the line length of the fishing line based on the number of rotations of the handle.

2. The fishing reel according to claim 1, wherein the calculated line length or the number of rotations of the handle is initialized on a basis of detection of a current throwing end or detection of a next throwing start.

3. The fishing reel according to claim 1, further comprising a storage unit, wherein the storage unit stores information of the throwing start, the throwing end, and the number of rotations of the handle, or the line length of the fishing line.

4. The fishing reel according to claim 1, wherein a throwing end of a current throwing is determined on a basis of detection of a next throwing start by the throwing detection unit.

5. The fishing reel according to claim 1, wherein the throwing detection unit is a bail, and a throwing end of a current throwing is determined by detecting an operation of the bail operated at a time of throwing.

6. The fishing reel according to claim 1, wherein the throwing detection unit detects an approach of a part to be detected provided on the fishing line, and a throwing end of a current throwing is determined on a basis of the detection.

7. The fishing reel according to claim 1 further comprising a display unit, wherein the display unit displays the line length of the fishing line.

8. The fishing reel according to claim 1, further comprising a transmission-detection unit, wherein the transmission-detection unit transmits the line length of the fishing line to an external device including a portable device, a wearable device, or a computer device.

9. The fishing reel according to claim 1, wherein the drag release amount is initialized on a basis of detection of the throwing end or detection of the throwing start.

10. A fishing information processing system, comprising:

a fishing reel comprising:

a throwing detection unit configured to detect a throwing start and a throwing end, a drag release amount detection unit that detects a drag release amount, and a handle rotation detection unit that detects a number of rotations of a handle of the fishing reel, and an information processing device comprising:

a line length calculation unit that calculates a line length of a released fishing line, wherein the line length calculation unit calculates the line length of the fishing line:

on a basis of the number of rotations of the handle by the handle rotation detection unit from the throwing start to the throwing end, and by subtracting a difference based on the drag release amount from the line length of the fishing line based on the number of rotations of the handle.

11. The fishing information processing system according to claim 10, wherein the information processing device further comprises a transmission-reception unit, and the transmission-reception unit receives information of the throwing start, the throwing end, the drag release amount, and the number of rotations of the handle of the fishing reel.

12. The fishing information processing system according to claim 10, wherein the information processing device further comprises a transmission-reception unit, and the transmission-reception unit transmits information of the calculated line length of the fishing line to the fishing reel.

13. The fishing information processing system according to claim 10, wherein the information processing device further comprises a display unit, and the display unit displays the line length of the fishing line.

14. The fishing information processing system according to claim 10, wherein the information processing device is a mobile terminal, a wearable terminal, or a computer device.

15. An information processing device, comprising:

a reception unit that receives information from a device external to the information processing device, and a line length calculation unit that calculates a line length of a fishing line, wherein:

the reception unit receives information of a throwing start, information of a throwing end, information of a drag release amount, and information of a number of rotations of a handle of a fishing reel from the external device, and the line length calculation unit calculates the line length of the fishing line:

on a basis of the number of rotations of the handle from the throwing start to the throwing end, and by subtracting a difference based on the drag release amount from the line length of the fishing line based on the number of rotations of the handle.

* * * * *